United States Patent
Kanemitsu et al.

[11] Patent Number: 5,732,581
[45] Date of Patent: Mar. 31, 1998

[54] METHOD FOR PRODUCING A SHEET METAL POLY-V GROOVE PULLEY AND A SHEET METAL POLY-V GROOVE PULLEY

[75] Inventors: Toshiaki Kanemitsu, Kobe; Kazuyuki Oda, Hyogo; Shinji Sugimoto, Atashi, all of Japan

[73] Assignee: Kabushiki Kaisha Kanemitsu, Hyogo, Japan

[21] Appl. No.: 669,312

[22] PCT Filed: Dec. 25, 1995

[86] PCT No.: PCT/JP95/02678

§ 371 Date: Jul. 8, 1996

§ 102(e) Date: Jul. 8, 1996

[87] PCT Pub. No.: WO96/22848

PCT Pub. Date: Aug. 1, 1996

[51] Int. Cl.$^6$ .................................................. B21H 1/04
[52] U.S. Cl. .................................................. 72/68; 29/892.3
[58] Field of Search .................................. 72/68, 110, 111; 29/892, 892.3, 893.32

[56] References Cited

U.S. PATENT DOCUMENTS

| | | | |
|---|---|---|---|
| 5,072,509 | 12/1991 | Bichel et al. | 72/111 |
| 5,123,166 | 6/1992 | Kanemitsu et al. | 72/110 |
| 5,237,744 | 8/1993 | Himmeroeder | 72/68 |

FOREIGN PATENT DOCUMENTS

| | | | |
|---|---|---|---|
| 0 517 572 | 12/1992 | European Pat. Off. | 29/892 |
| 38 19 957 | 3/1989 | Germany | 29/892 |
| 62-84845 | 4/1987 | Japan . | |
| 5-185176 | 7/1993 | Japan . | |

*Primary Examiner*—Lowell A. Larson
*Attorney, Agent, or Firm*—Jones, Tullar & Cooper, P.C.

[57] ABSTRACT

The present invention relates a method of producing a sheet metal poly-V groove pulley in which a thickened annular peripheral wall of an outer peripheral side of a base plate is holding held and pressed so as to increase the axial length of the annular peripheral wall, thereby forming a drum wall and preliminary ears projected from the root portion of the drum wall, and thereafter a step of forming poly-V grooves and ears is performed so that poly-V grooves and ears which are obtained by further projecting the preliminary ears and have a single layer structure are formed on the drum wall. According to this method, the preliminary ears are previously formed and then further projected so as to form the ears. Even when a sheet metal member is thin, therefore, ears of a single-layer structure which has a sufficient projection degree can be obtained.

7 Claims, 12 Drawing Sheets

METHOD FOR PRODUCING A SHEET METAL POLY-V GROOVE PULLEY AND A SHEET METAL POLY-V GROOVE PULLEY

BACKGROUND OF THE INVENTION

1. Technical Field

The present invention relates to a method of producing a sheet metal poly-V groove pulley, and particularly to a method of producing a sheet metal poly-V groove pulley in which an ear consisting of a single material layer is annularly projected from an end of a drum wall having poly-V grooves with which a poly-V belt is to be engaged. A sheet metal poly-V groove pulley produced by the production method of the present invention may be used as, for example, a rotary part for transmitting rotation of an engine of an automobile.

2. Background Art

In a sheet metal poly-V groove pulley in which poly-V grooves are formed in a drum wall cylindrically extending from a base plate, an ear is formed annularly at an edge portion of the base plate side of the drum wall in order to prevent a poly-V belt from being disengaged.

A prior art method of providing a sheet metal poly-V groove pulley with such an ear is described in, for example, Japanese Patent Publication No. 57-18967. In the method described in the publication, a disc member is formed into a cup-like shape having a base plate and a drum wall, and a corner formed by the base plate and the drum wall is projected to have a double layer portion by predetermined means. The doubled portion, i.e., the double-layer portion having two material layers is used as an ear.

Another prior art method is described in, for example, Japanese Patent Publication No. 3-69611. In the method described in this publication, a disc member is formed into a cup-like shape having a base plate and a drum wall, and the root portion of the drum wall is split from the outside into two parts in the thickness direction of the base plate so that an ear having a single-layer structure or consisting of a single material layer is formed.

However, a method such as that described in Japanese Patent Publication No. 57-18967 in which a doubled portion produced by causing a corner formed by a base plate and a drum wall to be projected at double (double layer) by predetermined means is used as an ear has a problem in that it requires a material increased by the amount corresponding to the doubled structure of the ear and hence the material cost is raised. Furthermore, a sheet metal poly-V groove pulley in which an ear has a doubled structure has a problem in that, as a result of the use of the pulley, a crack easily occurs starting from the inner side of the front bent area of the double-layer portion.

In a method such as that described in Japanese Patent Publication No. 3-69611 in which the root portion of a drum wall is split into two parts in the thickness direction of a base plate so that an ear of a single-layer structure is formed, the base plate must have an increased thickness in order to ensure a required degree of the projection. At present, therefore, a disc member to be used as a starting material must satisfy the conditions that it has a thickness of at least about 2.6 mm so as to ensure a sufficient thickness of the base plate. In order to satisfy these conditions, a thick sheet metal member must be used as a disc member which is to be formed into a cup-like shape. In the state of the art, therefore, it is impossible to reduce the weight of such a pulley and its material cost.

SUMMARY OF THE INVENTION

The present invention was developed in view of the above-mentioned circumstances. It is an object of the present invention to provide a method of producing a sheet metal poly-V groove pulley, and a sheet metal poly-V groove pulley in which, even when a thin sheet metal member having a thickness less than 2.6 mm (for example, a sheet metal member of 2 mm) is used, the requirement of the projection degree in an ear of a single-layer structure can be sufficiently satisfied.

In order to attain the above-mentioned object, the method of producing a sheet metal poly-V groove pulley of the present invention comprises the steps of: holding and pressing a thickened annular peripheral wall of an outer peripheral side of a base plate to increase the axial length of the annular peripheral wall, thereby forming a cylindrical drum wall which is thicker than the base plate but thinner than the annular peripheral wall; projecting a preliminary ear consisting of a single material layer, from the root portion of the drum wall; and holding and pressing the drum wall from which the preliminary ear is projected, to form poly-V grooves in the drum wall; and further projecting the preliminary ear, thereby forming an ear.

According to the present invention, a thickened annular peripheral wall is thinned so that a drum wall of an increased axial length is formed, and, when the drum wall is formed, a preliminary ear consisting of a single material layer is projected from the root portion of the drum wall. By using a thin sheet metal member, therefore, a sheet metal poly-V groove pulley is provided with an ear of a single-layer structure which has a sufficient degree of projection and strength.

In the production method, in the formation of the drum wall and the preliminary ear, the drum wall and the preliminary ear may be formed by holding and pressing one time the annular peripheral wall, or by holding and pressing plural times the annular peripheral wall.

In the production method, preferably, the thickened annular peripheral wall is formed by conducting a pressing step in which a flange-shaped portion projected from the outer peripheral side of the base plate is pressed in the axial direction, thereby shaping the flange-shaped portion into an inclined annular wall, and then pressing the flange-shaped portion including the inclined annular wall by a shaping roller in a radially inward direction, thereby forming the flange-shaped portion into an outward swelling shape. Preferably, the projection of the preliminary ear is conducted by holding and pressing the annular peripheral wall except the portion where the preliminary ear is formed, by a circular pattern tool positioned inside the annular peripheral wall, and a circular roller positioned outside the annular peripheral wall. As the shaping roller, it is preferable to use a roller comprising a forming face on the outer periphery which has a curved recess shape and which is used for pressing the flange-shaped portion including the inclined annular wall in a radially inward direction.

When this method is employed, the production time can be shortened as compared with the case where a disc member is drawn to form a cup-shaped member, the cylindrical peripheral wall of the cup-shaped member is thickened to form an annular peripheral wall, and the annular peripheral wall is then held and pressed in order to thin the wall, thereby forming a drum wall and a preliminary ear. Particularly, the process of shaping the inclined annular wall on the flange-shaped portion is produced by the pressing step. Therefore, the annular peripheral wall can be shaped in a short time so that a series of steps of producing a sheet metal poly-V groove pulley is smoothly executed. In other words, the time required for executing the step of forming a thickened annular peripheral wall is not longer than that required for executing the other steps.

The cylindrical drum wall and the preliminary ear may be formed by providing an inclined annular peripheral wall forming step in which the flange-shaped portion projected from the outer peripheral side of the base plate is formed on the thick inclined annular peripheral wall, and then holding and pressing the inclined annular peripheral wall.

When this method is employed, the production time can be shortened as compared with the case where a disc member is drawn to form a cup-shaped member, the cylindrical peripheral wall of the cup-shaped member is thickened to form an annular peripheral wall, and the annular peripheral wall is then held and pressed in order to thin the wall, thereby forming a drum wall and a preliminary ear.

In the production method, preferably, the cylindrical drum wall and the preliminary ear are formed by holding and pressing the annular peripheral wall except the portion where the preliminary ear is formed, by a circular pattern tool positioned inside the annular peripheral wall, and a circular roller positioned outside the annular peripheral wall.

When this configuration is employed, the preliminary ear can be projected at the same time when the drum wall is formed from the annular peripheral wall.

In the step of forming an inclined annular peripheral wall, when the flange-shaped portion projected from the outer peripheral side of the base plate is pressed in a radially inward direction while being inclined in a flaring manner, a force in the thickness-increasing direction is applied to the inclined portion, and at the same time the projection width of the flange-shaped portion is gradually reduced, thereby enabling the inclined portion to be thickened. In this case, it is preferable to use a circular roller comprising a V-like forming face consisting of: a tapered forming face which is to abut against the outer peripheral portion of the flange-shaped portion; and an abutting face which extends from the larger-diameter end portion of the tapered forming face in a flaring manner and positionally restricts the end face of the inclined face formed in the flange-shaped portion.

When this configuration is employed, without producing undue stress on the flange-shaped portion, the inclined portion can be formed, and the inclined portion can be thickened. Furthermore, the final length of the inclined portion can be surely controlled so that the subsequent step of forming a drum wall and a preliminary ear is smoothly executed.

According to the production method of the present invention, in the step of forming an inclined annular peripheral wall, it has been possible to form an annular peripheral wall having a thickness which is 2 or more times that of the base plate (in a prototype, 2.5 or more times). Even when a disc member made of steel (a thickness of 2 mm) which is thinner than a disc member used in a prior art method (having a thickness of 2.6 mm) is used as a starting material, for example, an annular peripheral wall which is very thick or has a thickness of 5 mm can be easily obtained. When such a thick annular peripheral wall is once formed, the thickness of a drum wall which is to be formed in a following step and from which a preliminary ear is projected can be made 2.6 mm or more. When this configuration is employed, it is possible to obtain a sheet metal poly-V groove pulley which has a base plate of a reduced thickness and is light and inexpensive while the pulley has poly-V grooves and an ear of a single-layer structure in the same manner as the prior art.

DESCRIPTION OF THE PREFERRED EMBODIMENTS

In the embodiment, a disc member 1 made of steel in which the thickness t1 is 2 mm or smaller than 2.6 mm is used as a starting material. A drawing process is conducted on the disc member 1 in order to form it into a hat-like shape.

Figure 1:
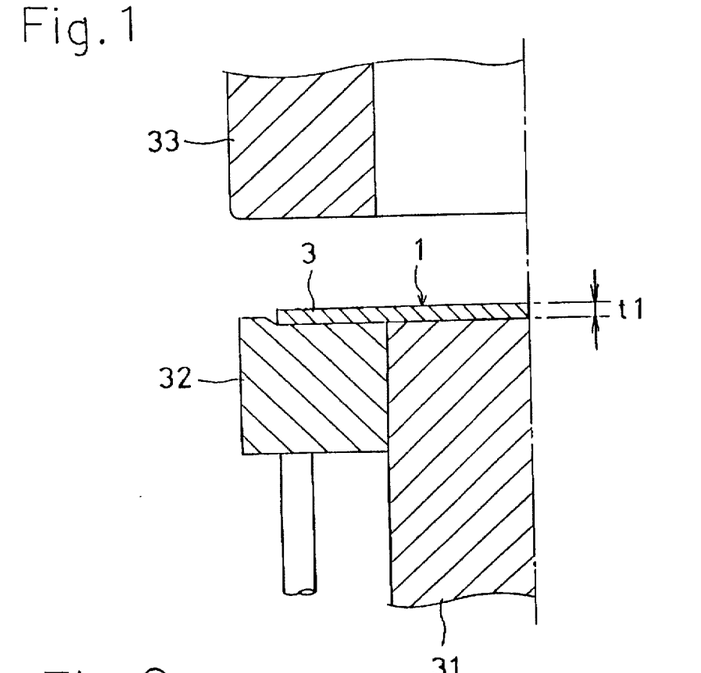
FIG. 1 is a view illustrating a preparatory step included in a method of producing a sheet metal poly-V groove pulley according to an embodiment of the present invention.
Figure 2:
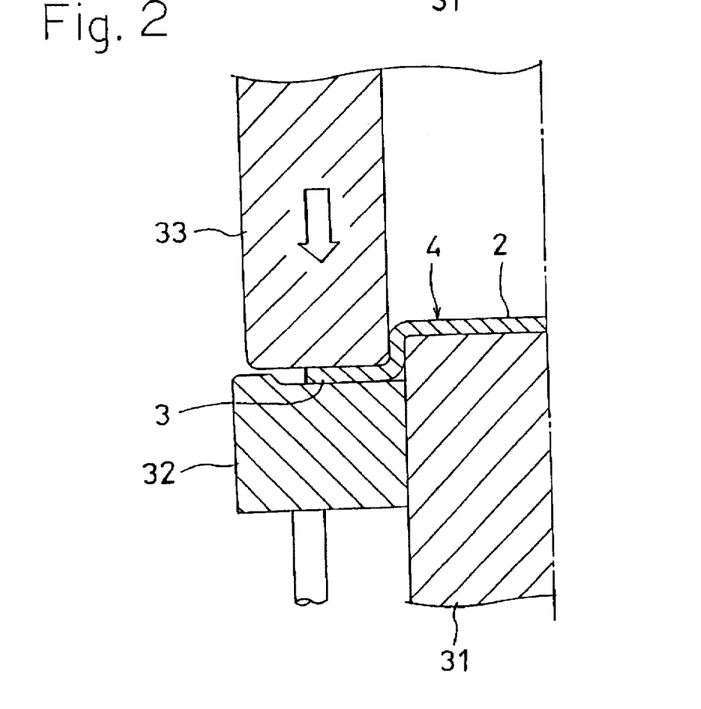
FIG. 2 is a view illustrating a drawing step.

FIG. 1 shows a preparatory step in which the disc member 1 is placed on a stationary bottom pattern tool 31 which is used for the drawing process, and also on a movable bottom pattern tool 32 which is liftable outside the stationary bottom pattern tool, and a movable top pattern tool 33 faces the disc member 1. Under this state, the movable top pattern tool 33 is lowered together with the movable bottom pattern tool 32 so as to press the outer peripheral portion 3 of the disc member 1 downwardly. As a result, as shown in FIG. 2, a hat-shaped drawn article 4 is obtained in which the outer peripheral portion 3 of the disc member 1 is stepwise lowered by one stage from the center portion 2 supported by the stationary bottom pattern tool 31.

Figure 3:
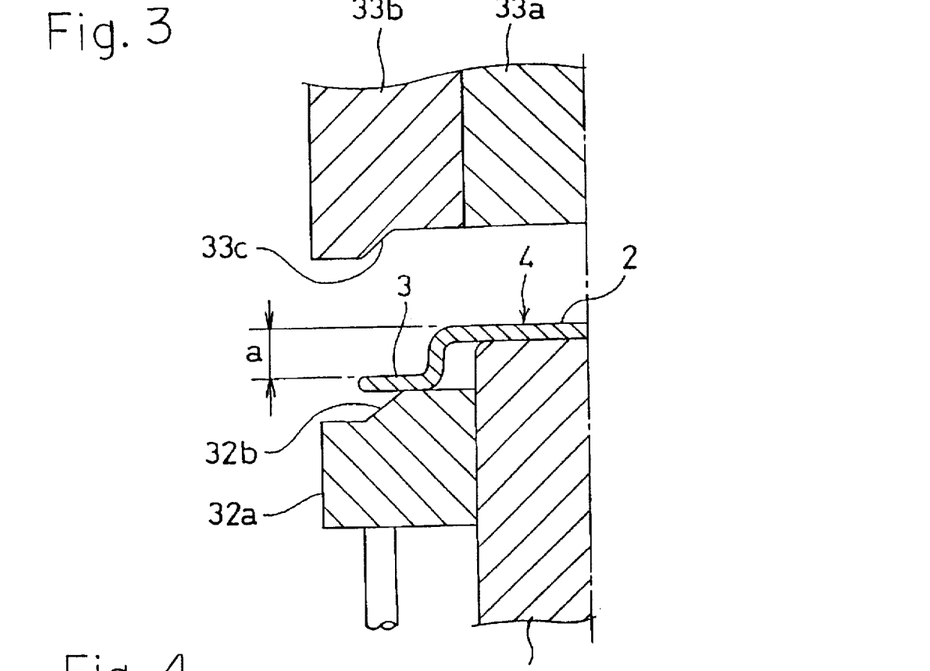
FIG. 3 is a view illustrating a preparatory step for forming an inclined annular peripheral wall.
Figure 4:
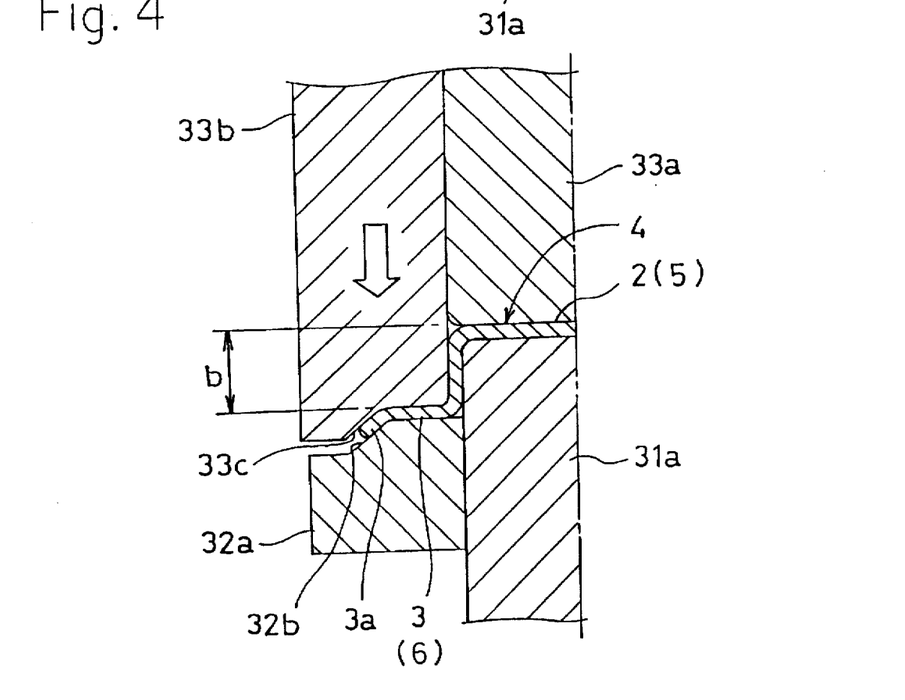
FIG. 4 is a view illustrating a pressing step of forming an inclined annular wall.

The drawn article 4 is then transferred to a pressing step. In the pressing step, as shown in FIG. 3, the center portion 2 of the drawn article 4 is placed on a stationary bottom pattern tool 31a, a part of the outer peripheral portion 3 which is adjacent to the center portion 2 via a step a is placed on a movable bottom pattern tool 32a which is liftable outside the stationary bottom pattern tool 31a, and two movable top pattern tools 33a, 33b face downward to the drawn article. Forming faces 32b, 33c which flare downward are formed on the movable bottom pattern tool 32a, and a movable top pattern tool 33b corresponding to the bottom pattern tool, respectively. When the two movable top pattern tools 33a, 33b are lowered to sandwich the center portion 2 of the drawn article 4 between the stationary bottom pattern tool 31a and the movable top pattern tool 33a and the outer peripheral portion 3 of the drawn article 4 between the movable bottom pattern tool 32a and the movable top pattern tool 33b as shown in FIG. 4, therefore, the peripheral part of the outer peripheral portion 3 is held and pressed by the forming faces 32b, 33c so as to be formed into an inclined annular wall 3a which flares downward. At the same time, the peripheral part of the center portion 2 of the drawn article 4 is sandwiched between the movable top pattern tool 33b and the stationary bottom pattern tool 31a to be drawn, thereby shaping the step a between the center portion 2 and the outer peripheral portion 3 shown in FIG. 3 so as to become larger. In FIG. 4, the step between the center portion 2 and the outer peripheral portion 3 is indicated by a reference symbol b. In the drawn article 4 which has been shaped as shown in FIG. 4, the center portion 2 corresponds to a base plate 5, and the outer peripheral portion including the annular wall 3a to a flange-shaped portion 8. An annular peripheral wall forming step is then performed on the flange-shaped portion 6.

Figure 5:
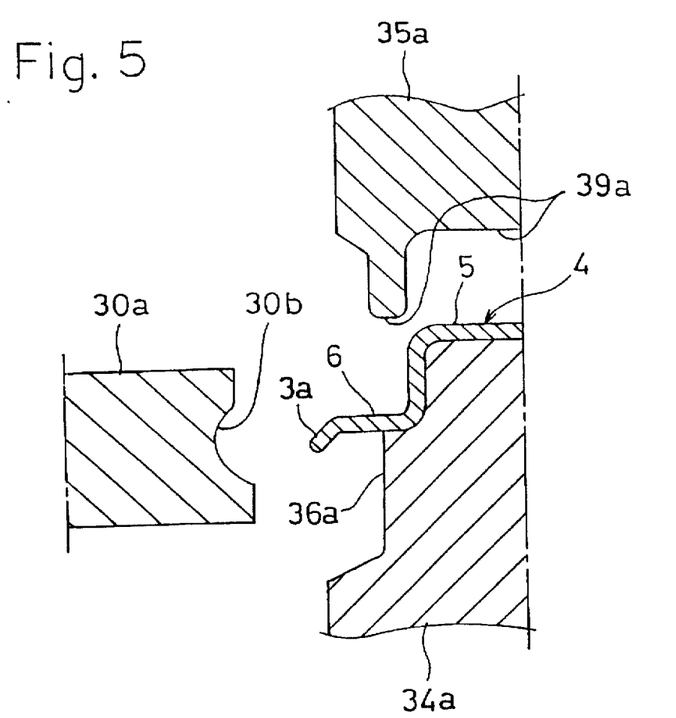
FIG. 5 is a view illustrating a preparatory step for forming a flange-shaped portion into an outward swelling shape.

FIG. 5 shows a preparatory step for the annular peripheral wall forming step. In the preparatory step, the drawn article 4 is placed on a circular bottom pattern tool 34a which supports the base plate 5 and a part of the flange-shaped portion 6 from the lower side, a circular top pattern tool 35a faces the drawn article from the upper side, and a shaping roller 30a faces the drawn article from the lateral side. The circular bottom pattern tool 34a has a cylindrical face 36a. The circular top pattern tool 35a comprises a pressing face 39a which has a recess shape and which corresponds to the base plate 5 of the drawn article 4 and the part of the flange-shaped portion 6 supported by the circular bottom pattern tool 34a. The shaping roller 30a has a forming face 30b which has a curved recess shape, on its outer periphery.

Figure 6:
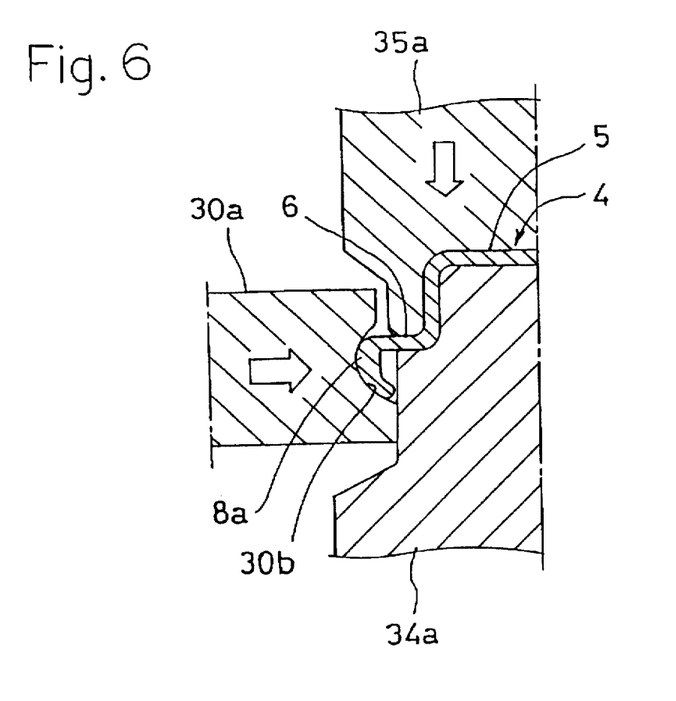
FIG. 6 is a view illustrating a step of forming the flange-shaped portion into an outward swelling shape.

After the preparatory step of FIG. 5, the circular top pattern tool 35a is lowered as shown in FIG. 6 so that the base plate 5 of the drawn article 4 and the part of the flange-shaped portion 6 are vertically sandwiched between the circular top pattern tool and the circular bottom pattern tool 34a. Under this state, the drawn article 4 is rotated together with the circular bottom pattern tool 34a and the circular top pattern tool 35a. The annular peripheral wall forming step is then produced on the flange-shaped portion (the flange-shaped portion including the annular wall 3a which is inclined in a downward flaring manner) 6.

Figure 11:
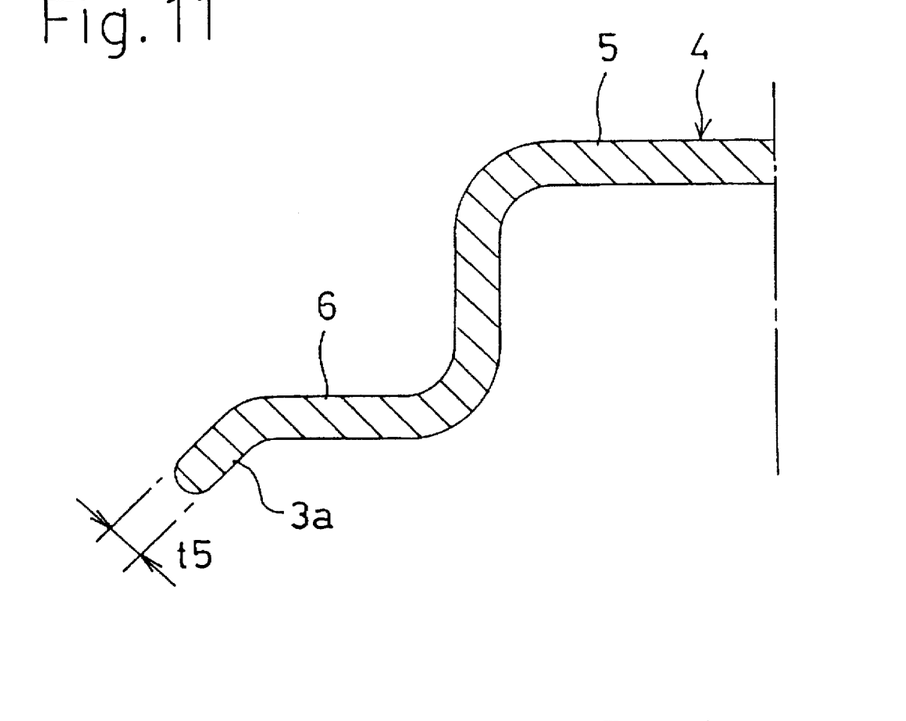
FIG. 11 is a partial end view showing the inclined annular peripheral wall which is formed in the pressing step.
Figure 12:
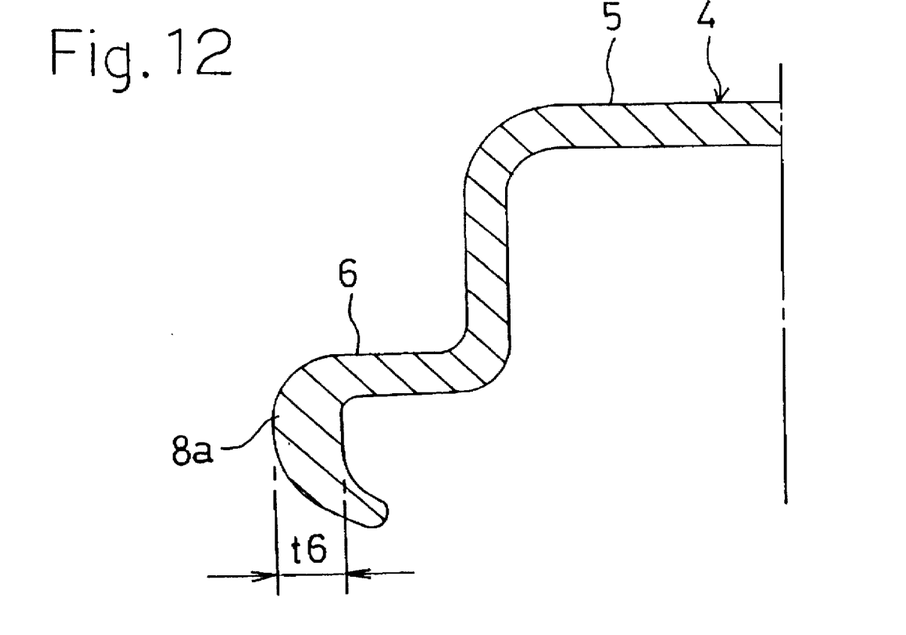
FIG. 12 is a partial end view showing the thickened annular peripheral wall which is obtained by forming the flange-shaped portion into an outward swelling shape.

The annular peripheral wall forming step is a step in which the flange-shaped portion 6 is pressed by the shaping roller 30a in a radially inward direction, thereby forming the flange-shaped portion into an outward swelling shape. Specifically, as shown in FIG. 6, the curved and recessed forming face 30b of the shaping roller 30a laterally contacts with the annular wall 3a of the flange-shaped portion 6, and the flange-shaped portion 6 including the annular wall 3a is pressed in a radially inward direction by the forming face 3a of the shaping roller 30a, while allowing the shaping roller 30a to follow the rotation. As a result of conducting this step, the flange-shaped portion 6 is formed into an outward swelling shape along the forming face 3a, and at the same time thickened. In FIG. 11, the thickness of the inclined annular wall 3a which is formed when performing the pressing step on the drawn article 4 is indicated by a reference symbol t5, and, in FIG. 12, the thickness of the annular peripheral wall 8a which is obtained by forming a part of the flange-shaped portion 6 into an outward swelling shape is indicated by a reference symbol t6. In the embodiment, t5>t6 or the annular peripheral wall 8a is made thicker than the annular wall 3a.

In the embodiment, the thickness t6 of the annular peripheral wall 8a which is formed by performing the above-mentioned step of forming an inclined annular peripheral wall was set to be 5 mm. In other words, the thickness was set to be 2.5 times the thickness t1 of the disc member 1. The thickness of the annular peripheral wall 8a which is thickened by the annular peripheral wall forming step may be set to be 2.5 or more times the thickness t1 of the disc member 1. In order for the thickness of the annular peripheral wall 8a to be made 2.5 or more times the thickness t1 of the disc member 1, it is beneficial to conduct the steps described with reference to FIGS. 4 to 6. When these steps were performed, the thickening was able to be surely accomplished in a short time without using a very large facility.

Figure 7:
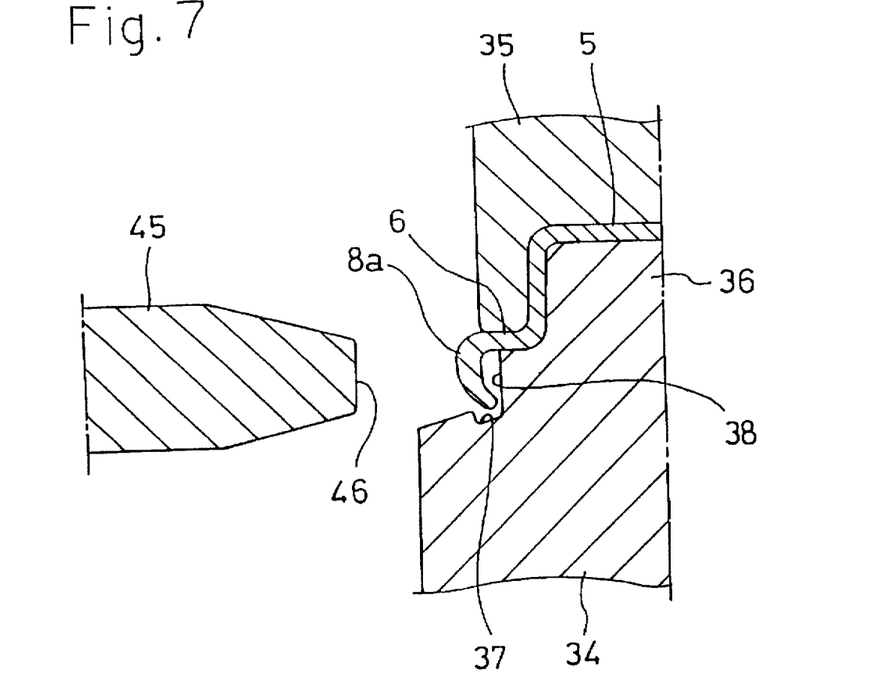
FIG. 7 is a view illustrating a preparatory stage for a step of forming a drum wall and preliminary ears.

After the annular peripheral wall forming step, a step of forming a drum wall and preliminary ears is conducted. As shown in FIG. 7, this step is performed by a method in which, while holding the base plate 5 between a protrusion 36 of a circular bottom pattern tool 34 and a circular top pattern tool 35, the thickened annular peripheral wall 8a is rotated, and another circular roller 45 having a flat forming face 46 is horizontally moved in order to be pressed against the outer peripheral portion of the annular peripheral wall 8a as shown in FIG. 8, whereby the diameter of the front end portion of the annular peripheral wall 8a is reduced in order to be pressed against the rising face 38 of the circular bottom pattern tool 34.

Figure 8:
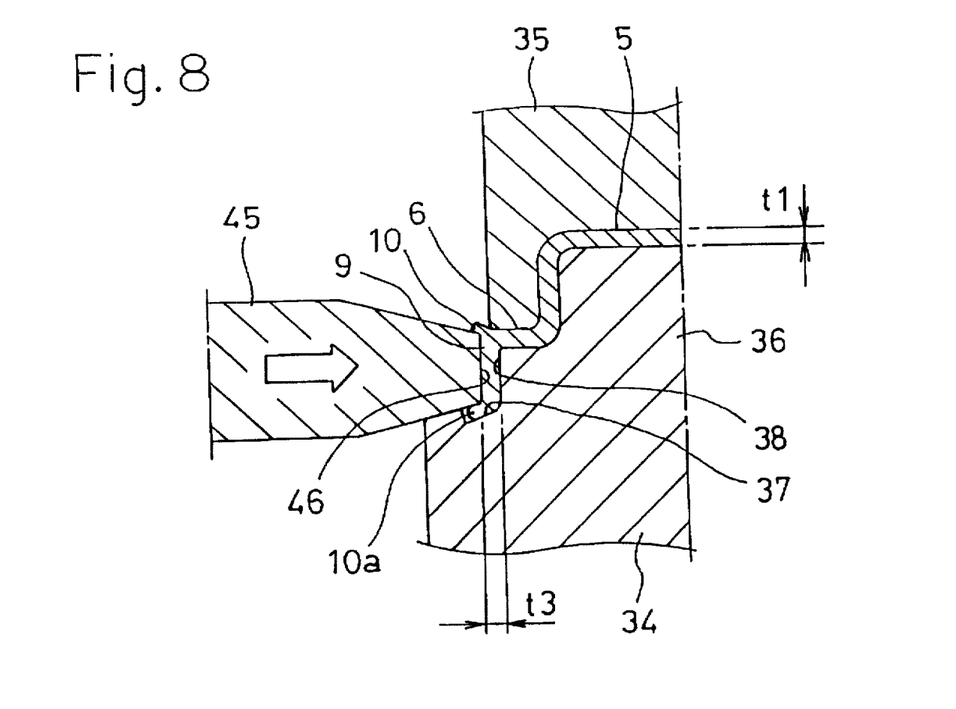
FIG. 8 is a view illustrating the step of forming a drum wall and preliminary ears.

Specifically, as shown in FIGS. 7 and 8, when the circular roller 45 is horizontally moved so that the forming face 46 gradually presses the outer face of the annular peripheral wall 8a in a radially inward direction, the annular peripheral wall 8a is thinned while its axial length is increased. The axial length of the annular peripheral wall 8a is increased until the end face of the annular peripheral wall abuts against a bottom face 37 which is formed on the circular bottom pattern tool 34 and flares downward. The thickness t3 of a drum wall 9 which is formed in this way is made larger than the thickness t1 of the base plate 5 but smaller than the thickness t6 (see FIG. 12) of the annular peripheral wall 8a. In parallel with the formation of the drum wall 9, preliminary ears 10, 10a project from the root portion of the drum wall 9. In this case, as shown in FIG. 8, when the outer face of the annular peripheral wall 8a, except the portion where the preliminary ears are formed, is pressed by the forming face 46 of the circular roller 45, the preliminary ears 10, 10a are projected in parallel with the formation of the drum wall 9 having the thickness t3. The thickness t3 of the drum wall 9 is set to be 2.6 mm.

Figure 9:
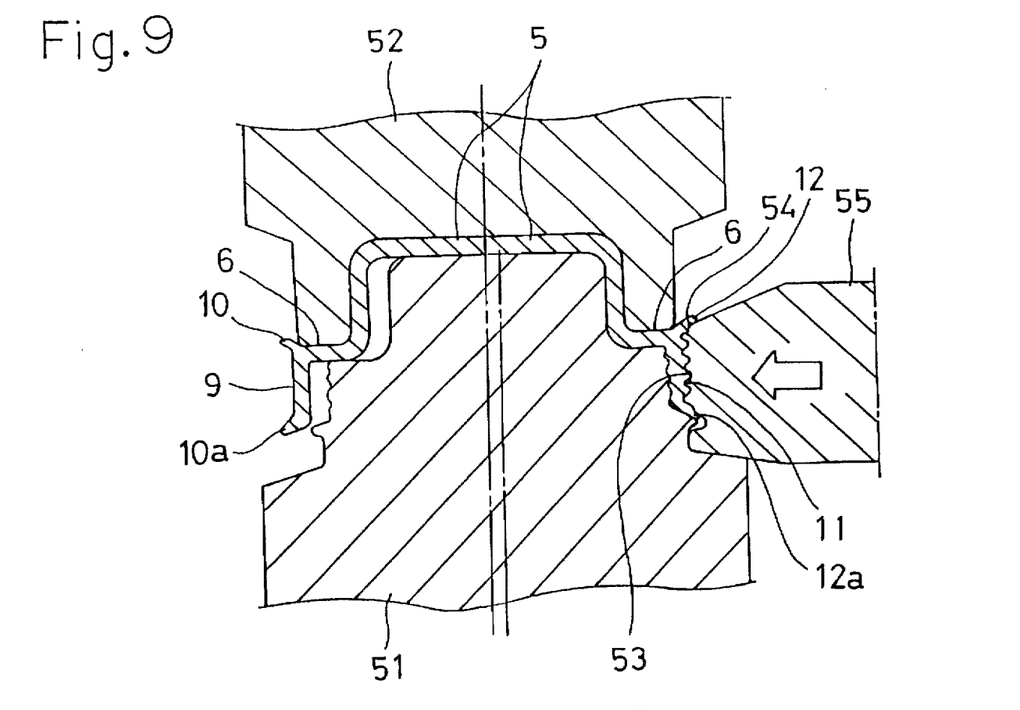
FIG. 9 is a view illustrating an intermediate stage of a step of forming poly-V grooves and ears.
Figure 10:
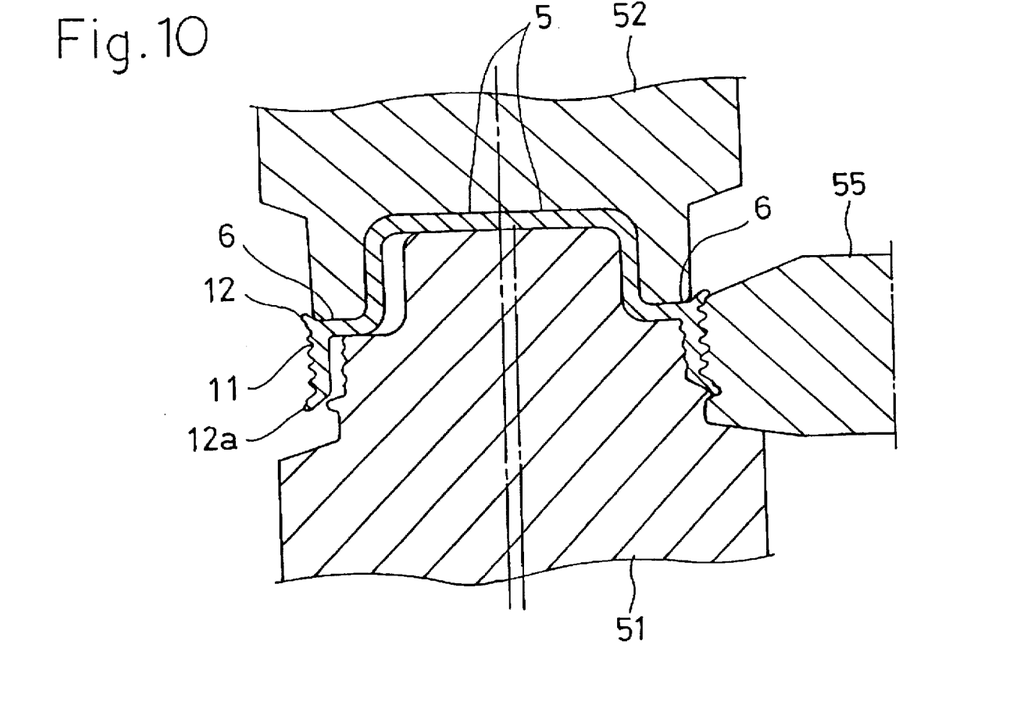
FIG. 10 is a view illustrating a finishing stage of the step of forming poly-V grooves and ears.

After the step of forming a drum wall and preliminary ears, a step of forming poly-V grooves and ears is performed on the drum wall 9. This step of forming poly-V grooves and ears is performed in the following manner. As shown in FIG. 9, the base plate 5 is sandwiched between a circular bottom pattern tool 51 and a circular top pattern tool 52 which is eccentric with respect to the bottom pattern tool, and the pattern tools 51, 52 are then rotated, thereby rotating the base plate 5. A circular roller 55 having a poly-V groove forming face 53 and an ear forming face 54 is pressed against the drum wall 9. As a result of performing this step, a plurality of portions in the axial direction of the outer face of the drum wall 9 from which the preliminary ears 10, 10a described with reference to FIG. 8 are projected are pressed so that poly-V grooves 11 are formed. At the same time, the preliminary ears 10, 10a are further projected so that ears 12, 12a which radially protrude more outward than the crests of the poly-V grooves 11 are formed. Preferably, the step of forming a drum wall and preliminary ears is performed in several stages. When the step is performed in this way, the ears 12, 12' and the poly-V grooves 11 can be accurately formed. FIGS. 9 and 10 show a case where the step of forming poly-V grooves and ears is performed in two stages. FIG. 10 corresponds to a finishing step.

Next, another embodiment of the present invention will be described. In the embodiment, a disc member made of steel having a thickness t1 which is 2 mm or smaller than 2.6 mm is selected as a starting material. A drawing process is performed on the disc member 1 in order to form it into a hat-like shape.

Figure 13:
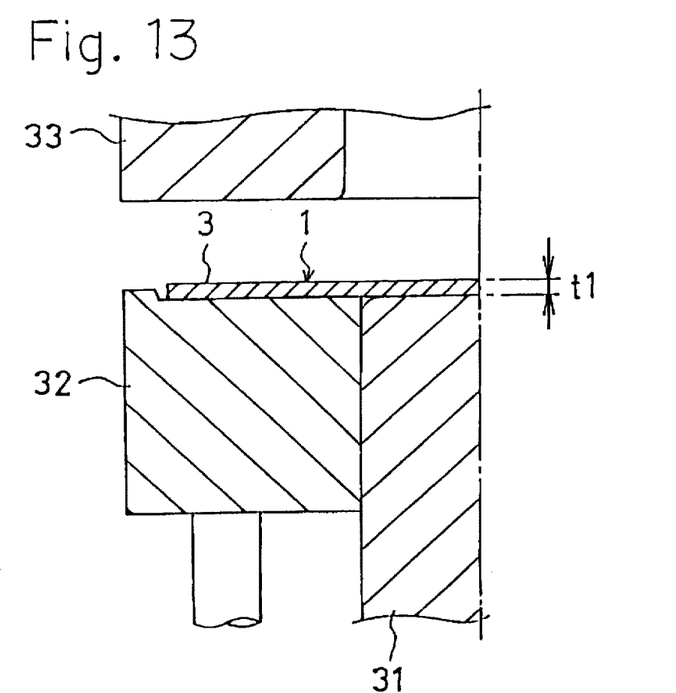
FIG. 13 is a view illustrating a preparatory step included in a method of producing a sheet metal poly-V groove pulley according to another embodiment of the present invention.
Figure 14:
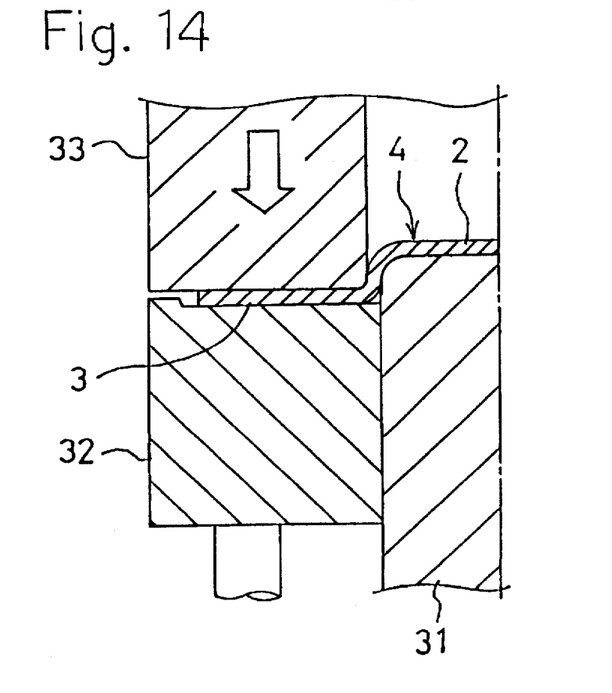
FIG. 14 is a view illustrating a drawing step.

FIG. 13 shows a preparatory step in which the disc member 1 is placed on a stationary bottom pattern tool 31 which is used for the drawing process, and also on a movable bottom pattern tool 32 which is liftable outside the stationary bottom pattern tool, and a movable top pattern tool 33 faces the disc member 1. Under this state, the movable top pattern tool 33 is lowered together with the movable bottom pattern tool 32 in order to press downward the outer peripheral portion 3 of the disc member 1. As a result, as shown in FIG. 14, a hat-shaped drawn article 4 is obtained in which the outer peripheral portion 3 of the disc member 1 is stepwise lowered by one stage from the center portion 2 supported by the stationary bottom pattern tool 31.

Figure 15:
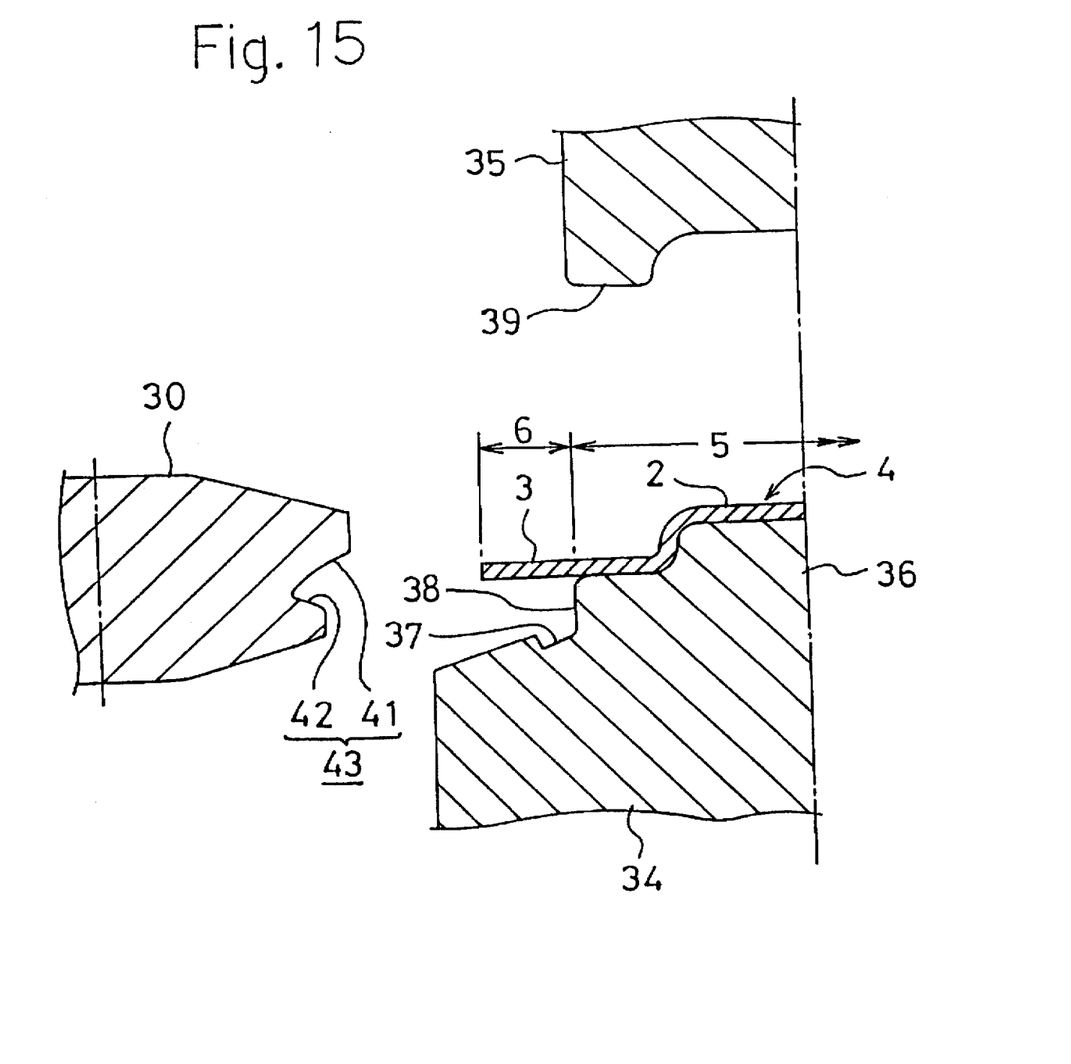
FIG. 15 is a view illustrating a preparatory step for a step of forming an inclined annular peripheral wall.

The drawn article 4 is then transferred to a step of forming an inclined annular peripheral wall. In a preparatory step for the inclined annular peripheral wall forming step, as shown in FIG. 15, the drawn article 4 is placed on a circular bottom pattern tool 34 which supports the center portion 2 and a part of the outer peripheral portion 3 from the lower side, a circular top pattern tool 35 faces the drawn article from the upper side, and a circular roller 30 faces the drawn article from the lateral side. The circular bottom pattern tool 34 comprises a protrusion 36 which supports the center portion 2 of the drawn article 4 and the part of the outer peripheral portion 3, and in addition, around the protrusion 36, an annular bottom face 37 which is inclined outward and downward, and a face 38 which perpendicularly rises from the inner periphery of the bottom face 37. The circular top pattern tool 35 comprises a recessed pressing face 39 corresponding to the center portion 2 of the drawn article 4 and the part of the outer peripheral portion which are supported by the protrusion 36 of the circular bottom pattern tool 34. The circular roller 30 comprises a V-like forming face 43 consisting of: a tapered forming face 41 which flares downward; and an abutting face 42 which extends from the larger-diameter end portion of the tapered forming face 41 in a downward flaring manner (forward flaring manner).

Figure 16:
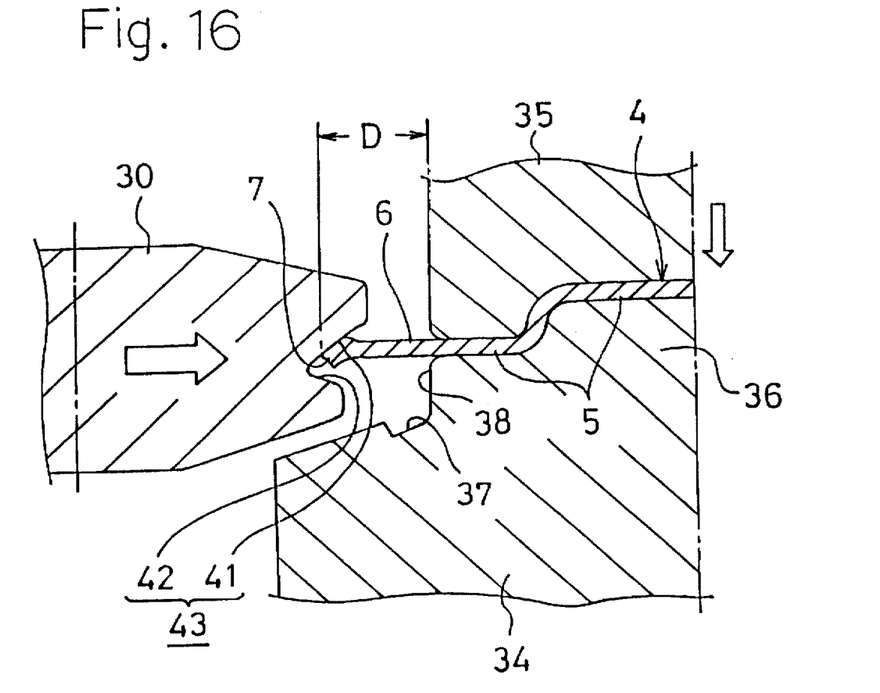
FIG. 16 is a view illustrating a prestage of the step of forming an inclined annular peripheral wall.

After the preparatory step of FIG. 15, the circular top pattern tool 35 is lowered as shown in FIG. 16 so that the center portion 2 of the drawn article 4 and the part of the outer peripheral portion 3 are vertically sandwiched between the circular top pattern tool and the protrusion 38 of the circular bottom pattern tool 34. Under this state, the drawn article 4 is rotated together with the circular bottom pattern tool 34 and the circular top pattern tool 35. In the drawn article 4 which is held between the circular bottom pattern tool 34 and the circular top pattern tool 35, the portion sandwiched by the pattern tools 34, 35, i.e., the center portion 2 of the drawn article 4 and the part of the outer peripheral portion 3 correspond to the base plate 5, and the outer peripheral portion of the base plate 5 corresponds to the flange-shaped portion 6 (see FIG. 15). Then the inclined annular peripheral wall forming step is performed on the flange-shaped portion 6.

Figure 17:
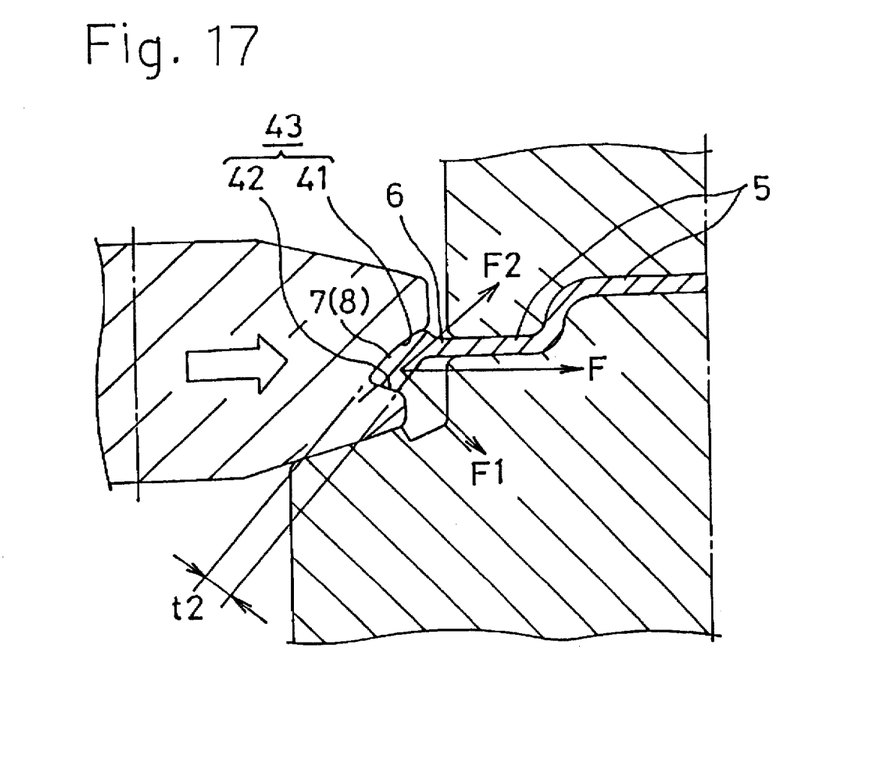
FIG. 17 is a view illustrating a poststage of the step of forming an inclined annular peripheral wall.

In the inclined annular peripheral wall forming step, the circular roller 30 is horizontally moved so as to approach the drawn article 4 which is held between the circular bottom pattern tool 34 and the circular top pattern tool 35. The tapered forming face 41 of the V-like forming face 43 disposed in the circular roller 30 first makes contact with the outer peripheral edge of the drawn article 4, and thereafter the circular roller 30 continues to be horizontally moved. Consequently, a force which presses the outer peripheral portion of the flange-shaped portion 6 down via the tapered forming face 41, and another force which compresses the flange-shaped portion 6 in a radially inward direction are generated. As a result, as shown in FIG. 16, an inclined portion 7 which is slightly thickened and flared forward is formed in the outer periphery of the flange-shaped portion 6, and the inclined portion 7 is pressed by the tapered forming face 41 in a radially inward direction. When the inclined portion 7 is pressed in a radially inward direction in this way, as shown in FIG. 17, a force F1 in a direction along which the inclined portion 7 is thickened, and a force F2 along the axis of the inclined portion 7 are generated as component forces of the pressing force F directed in a radially inward direction. Therefore, the projection width D (see FIG. 4) of the flange-shaped portion from the base plate 5 of the flange-shaped portion 6 is gradually reduced so that the inclined portion 7 is thickened and elongated. When the inclined portion 7 is further elongated and as shown in FIG. 5 its end face abuts against the abutting face 42 of the V-like forming face 43, the end face of the inclined portion 7 is positionally restricted, with the result that the thickening of the inclined portion 7 is further expedited so as to form an inclined annular peripheral wall 8 which is thickened.

In the above-mentioned step of forming an inclined annular peripheral wall, the base plate 5 is sandwiched by the protrusion 36 of the circular bottom pattern tool 34 and the circular top pattern tool 35 so that it is prevented from being thickened. When the inclined portion 7 is thickened, therefore, the thickness of the base plate 5 is not increased.

In the embodiment, the thickness t2 of the annular peripheral wall 8 which is formed as a result of performing the above-mentioned step of forming an inclined annular peripheral wall was set to be 5 mm, or 2.5 times the thickness t1 of the disc member 1. The thickness of the annular peripheral wall 8 which is thickened by the inclined annular peripheral wall forming step may be set to be 2.5 or more times the thickness t1 of the disc member 1. In order that the thickness of 15 the annular peripheral wall 8 is made 2.5 or more times the thickness t1 of the disc member 1, it is beneficial to conduct the steps described with reference to FIGS. 16 and 17. When these steps were performed, the thickening was able to be surely accomplished in a short time without using a very large facility.

After the inclined annular peripheral wall forming step, a step of forming a drum wall and preliminary ears is performed. This step is performed by the method in which, while holding the base plate 5 between the protrusion 36 of the circular bottom pattern tool 34 and the circular top pattern tool 35, the thickened annular peripheral wall 8 is rotated, and another circular roller 45 having a flat forming face 46 is horizontally moved in order to be pressed against the outer peripheral portion of the annular peripheral wall 8 as shown in FIG. 18, whereby the diameter of the front end portion of the annular peripheral wall 8 is reduced in order to be pressed against the rising face 38 of the circular bottom pattern tool 34.

Figure 18:
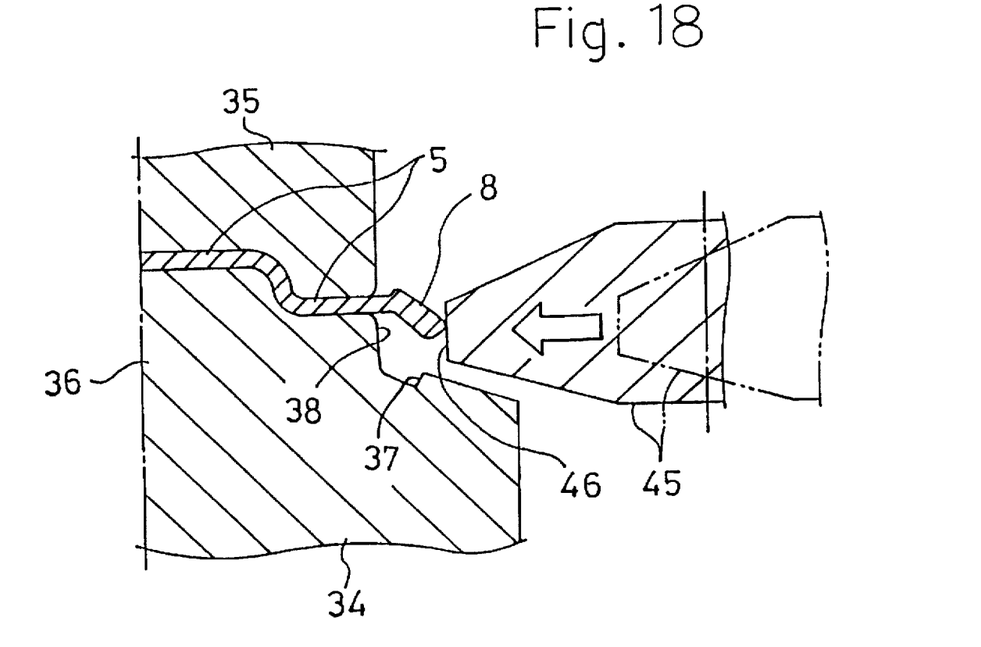
FIG. 18 is a view illustrating a prestage of a step of forming a drum wall and preliminary ears.
Figure 19:
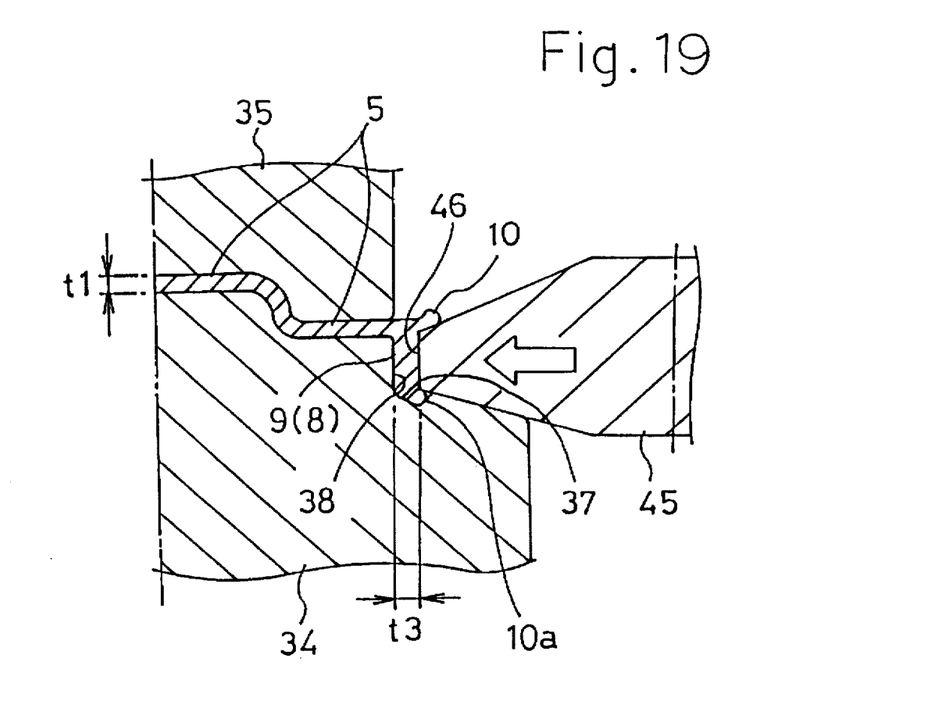
FIG. 19 is a view illustrating a poststage of the step of forming a drum wall and preliminary ears.

Specifically, as shown in FIGS. 18 and 19, when the circular roller 45 is horizontally moved so that the forming face 46 gradually presses the outer face of the annular peripheral wall 8 in a radially inward direction, the annular peripheral wall 8 is thinned while its axial length is increased. The axial length of the annular peripheral wall 8 is increased until the end face of the annular peripheral wall 8 abuts against the bottom face 37 of the circular bottom pattern tool 34. The thickness t3 of a drum wall 9 which is formed in this way is made larger than the thickness t1 of the base plate 5 but smaller than the thickness t2 of the annular peripheral wall 8. In parallel with the formation of the drum wall 9, preliminary ears 10, 10a project from the root portion of the drum wall 9. In this case, as shown in FIG. 19, when the outer face of the annular peripheral wall 8 except the portion where the preliminary ears are formed is pressed by the forming face 46 of the circular roller 45, the preliminary ears 10, 10a are projected in parallel with the formation of the drum wall 9 having the thickness t3. The thickness t3 of the drum wall 9 is set to be 2.6 mm.

Figure 20:
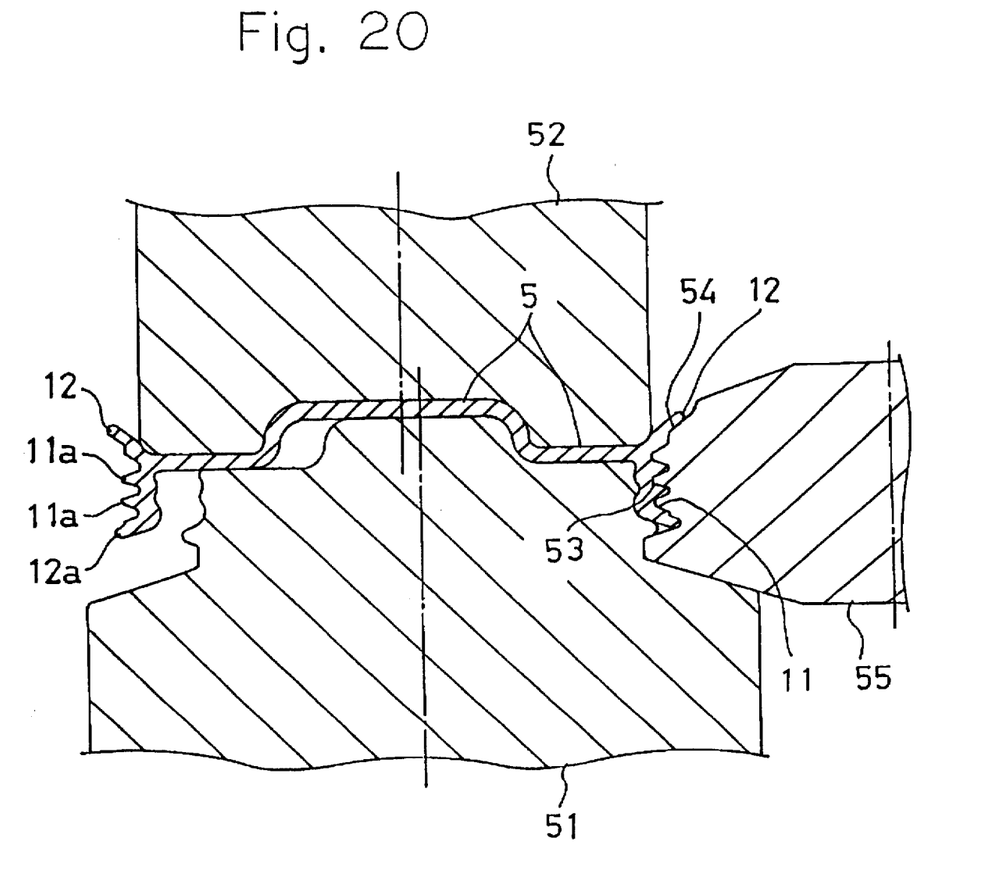
FIG. 20 is a view illustrating a step of forming poly-V grooves and ears.

After the step of forming a drum wall and preliminary ears, a step of forming poly-V grooves and ears is performed on the drum wall 9. This step of forming poly-V grooves and ears is performed in the following manner. As shown in FIG. 20, the base plate 5 is sandwiched between a circular bottom pattern tool 51 and a circular top pattern tool 52 which is eccentric with respect to the bottom pattern tool, and the pattern tools 51, 52 are then rotated, thereby rotating the base plate 5. A circular roller 55 having a poly-V groove forming face 53 and an ear forming face 54 is pressed against the drum wall 9 (see FIG. 19). As a result of performing this step, a plurality of portions in the axial direction of the outer face of the drum wall 9 from which the preliminary ears 10, 10a described with reference to FIG. 19 are projected are pressed so that poly-V grooves 11 are formed. At the same time, the preliminary ears 10, 10a are further projected so that ears 12, 12a which radially protrude outwardly more than the crests 11a of the poly-V grooves 11 are formed. Preferably, the step of forming poly-V grooves and ears is performed in several stages. When the step is performed in this way, the ears 12, 12' and the poly-V grooves 11 can be accurately formed.

Figure 21:
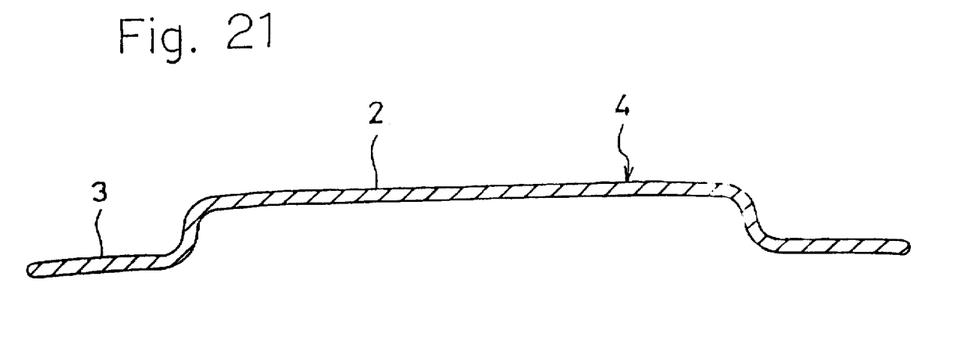
FIG. 21 is a section end view showing the shape of an intermediate product which has passed through the drawing step in the other embodiment.

FIG. 21 is a section end view accurately showing the shape of an intermediate product (prototype) which has passed through the drawing step. As seen from the figure, in the drawn article 4 which has passed through the drawing step, the thicknesses of the center portion 2 and the outer peripheral portion 3 are substantially equal to each other, and also to the thickness of the disc member 1 (see FIG. 1) used as a starting material.

Figure 22:
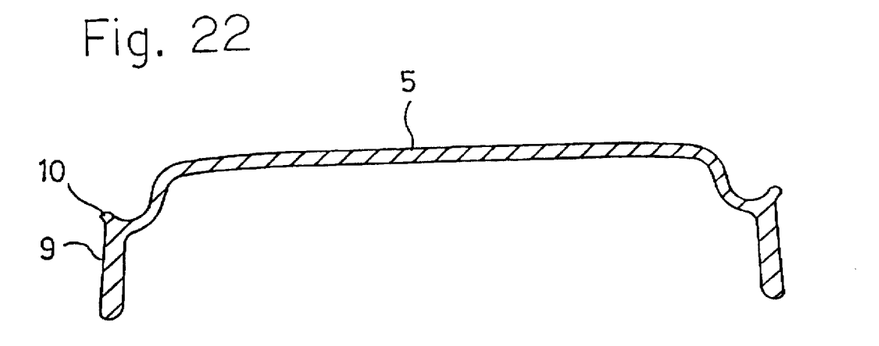
FIG. 22 is a section end view showing the shape of an intermediate product which has passed through the step of forming a drum wall and preliminary ears in the other embodiment.

FIG. 22 is a section end view accurately showing the shape of an intermediate product (prototype) which has passed through the step of forming a drum wall and preliminary ears. As seen from the figure, the drum wall 9 is thicker than the base plate 5. The preliminary ear 10 is projected from the root portion of the drum wall 9.

Figure 23:
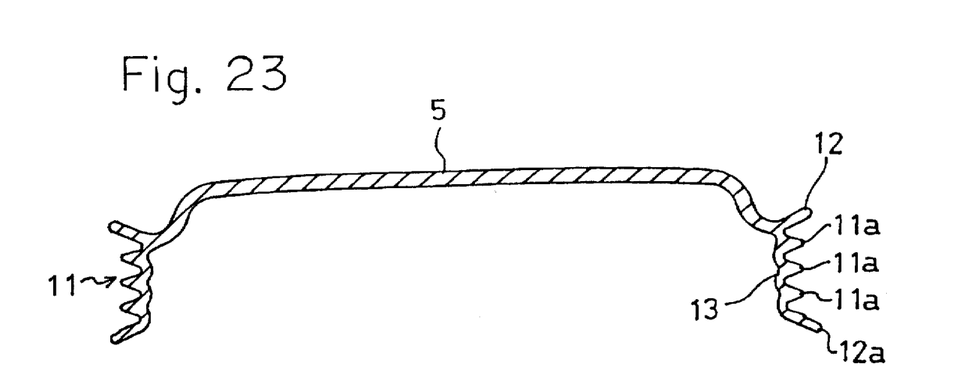
FIG. 23 is a section end view showing the shape of a sheet metal poly-V groove pulley which has been produced as a result of conducting the step of forming poly-V grooves and ears in the other embodiment.

FIG. 23 is a section end view accurately showing the shape of a sheet metal poly-V groove pulley (prototype) which has been produced by passing through the step of forming poly-V grooves and ears. As seen from the figure, the ears 12, 12a are projected more sufficiently than the crests 11a formed on a drum wall 13, so as to protrude in a radially outward direction, and the poly-V grooves 11 have a sufficient depth.

According to the method of producing a sheet metal poly-V groove pulley, and the sheet metal poly-V groove pulley of the present invention, even when a sheet metal member which is thinner than a member of the prior art is used as a starting material, a drum wall having poly-V grooves and an ear having a single-layer structure can be formed in the same manner as the prior art. Therefore, the present invention is effective in the case where weight and cost should be reduced.

We claim:

1. A method of producing a sheet metal poly-V groove pulley, comprising the steps of: forming a thickened annular peripheral wall by pressing a flange-shaped portion projected from the outer peripheral side of a base plate in an axial direction, thereby shaping the flange-shaped portion into an inclined annular wall, and then pressing the flange-shaped portion including the inclined annular wall by a shaping roller in a radially inward direction, thereby forming the flange-shaped portion into an outward swelling shape; holding and pressing the thickened annular peripheral wall to increase its axial length, thereby forming a cylindrical drum wall which is thicker than the base plate but thinner than the thickened annular peripheral wall; projecting a preliminary ear consisting of a single material layer, from a root portion of the drum wall; holding and pressing the drum wall from which the preliminary ear is projected, to form poly-V grooves in the drum wall; and further projecting the preliminary ear, thereby forming an ear.

2. A method of producing a sheet metal poly-V groove pulley according to claim 1, wherein:

the projection of said preliminary ear is performed by holding and pressing said annular peripheral wall except for a portion thereof where said preliminary ear is formed, by a circular pattern tool positioned inside said annular peripheral wall and a circular roller positioned outside said annular peripheral wall.

3. A method of producing a sheet metal poly-V groove pulley according to claim 1, wherein said shaping roller comprises on an outer periphery a forming face which has a curved recess shape and which is used for pressing said flange-shaped portion including said inclined annular wall in a radially inward direction.

4. A method of producing a sheet metal poly-V groove pulley according to claim 1, wherein, said annular peripheral wall is formed by an inclined annular peripheral wall forming step in which said flange-shaped portion is formed on said thick inclined annular peripheral wall.

5. A method of producing a sheet metal poly-V groove pulley according to claim 4, wherein, in said step of forming an inclined annular peripheral wall, said flange-shaped portion projected from said base plate is pressed in a radially inward direction while being inclined in a flaring manner, thereby applying a force in a thickness-increasing direction to said inclined portion, and at the same time a projection width of said flange-shaped portion is gradually reduced, thereby enabling said inclined portion to be thickened.

6. A method of producing a sheet metal poly-V groove pulley according to claim 5, wherein the thickening of said inclined portion is conducted by using a circular roller comprising a V-like forming face consisting of: a tapered forming face which is to abut against the outer peripheral portion of the flange-shaped portion; and an abutting face which extends from a larger-diameter end portion of said tapered forming face in a flaring manner and positionally restricts an end face of said inclined face formed in said flange-shaped portion.

7. A method of producing a sheet metal poly-V groove pulley according to claim 5, wherein, in said step of forming an inclined annular peripheral wall, a thick inclined annular peripheral wall having a thickness which is 2 or more times a thickness of said base plate is formed.

* * * * *